(No Model.) 6 Sheets—Sheet 1.
G. D. KING.
MACHINE FOR FORMING AND DRIVING WIRE STAPLES.
No. 325,611. Patented Sept. 1, 1885.
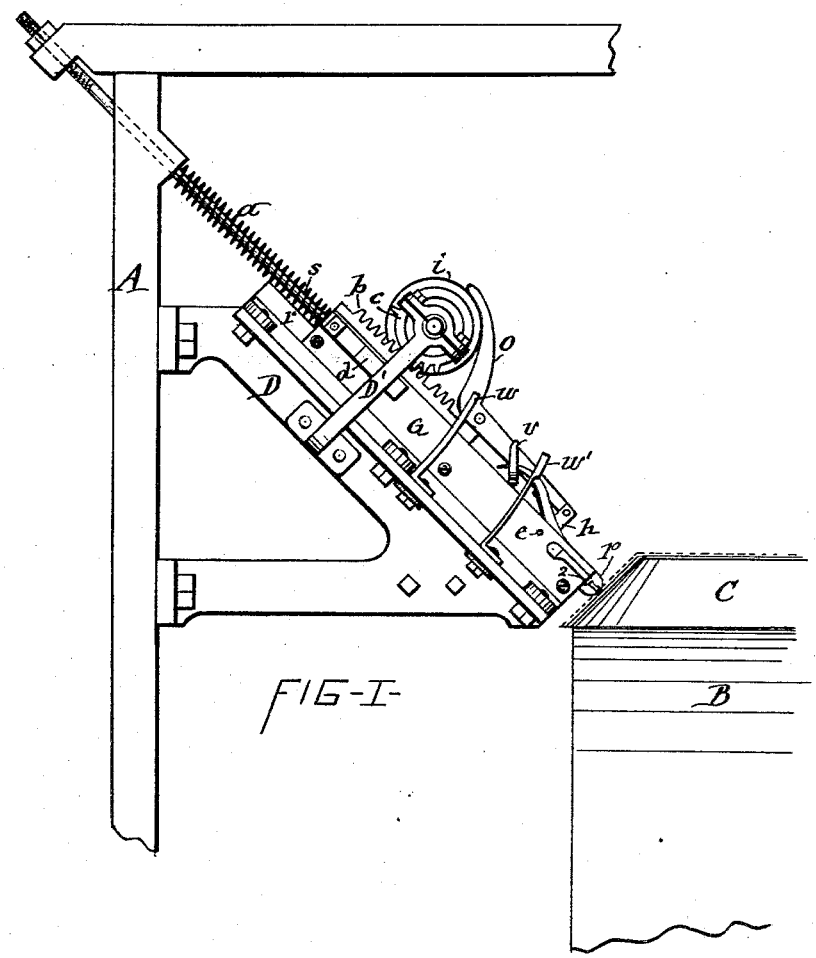
FIG-I-

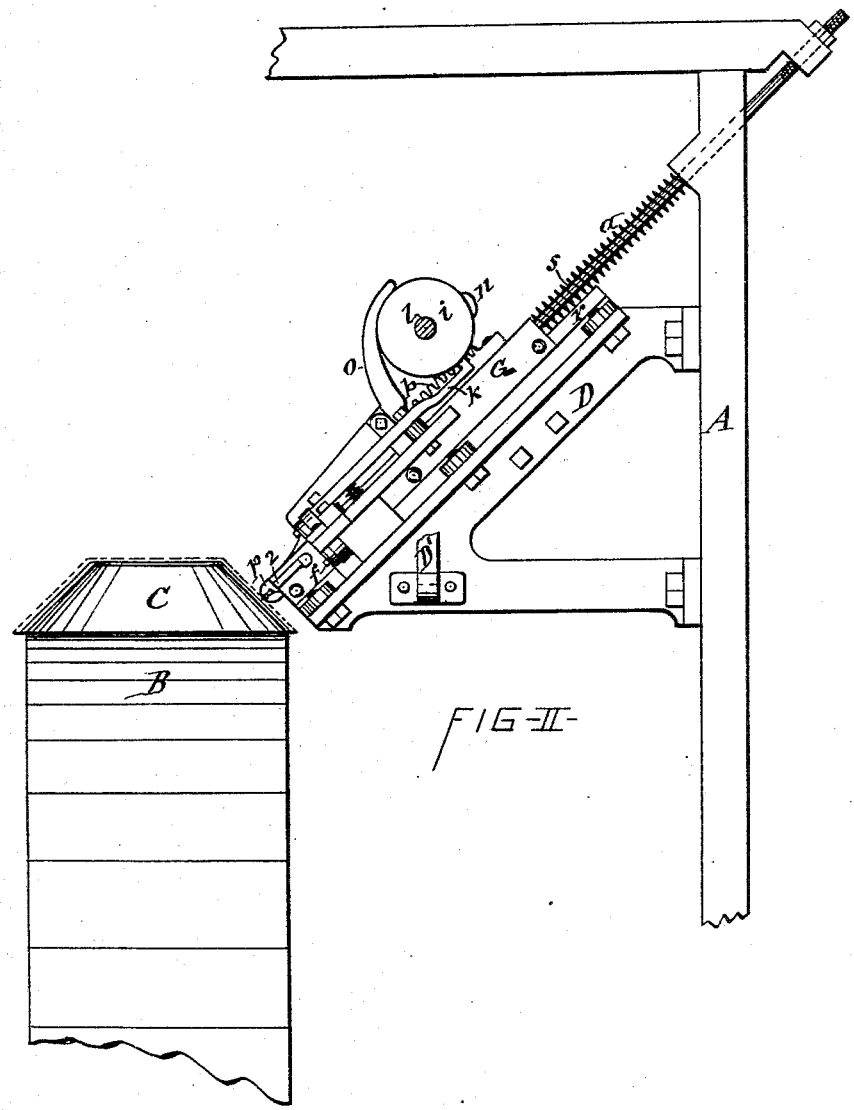

(No Model.) 6 Sheets—Sheet 3.
G. D. KING.
MACHINE FOR FORMING AND DRIVING WIRE STAPLES.
No. 325,611. Patented Sept. 1, 1885.
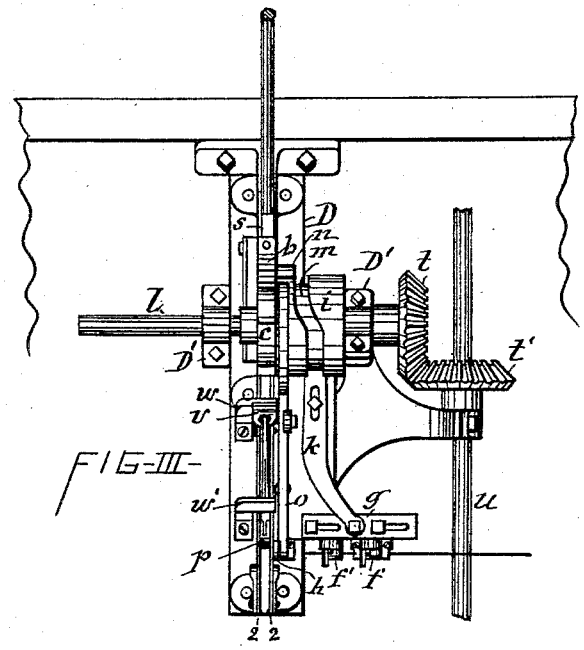
FIG-III-
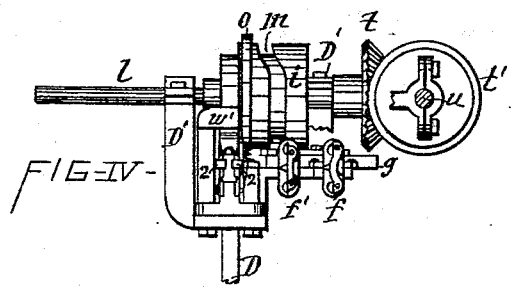
FIG-IV-
WITNESSES
C. Bendixon
Wm. C. Raymond
INVENTOR
George D. King
pr Dodd, Laasst Hey
his attys

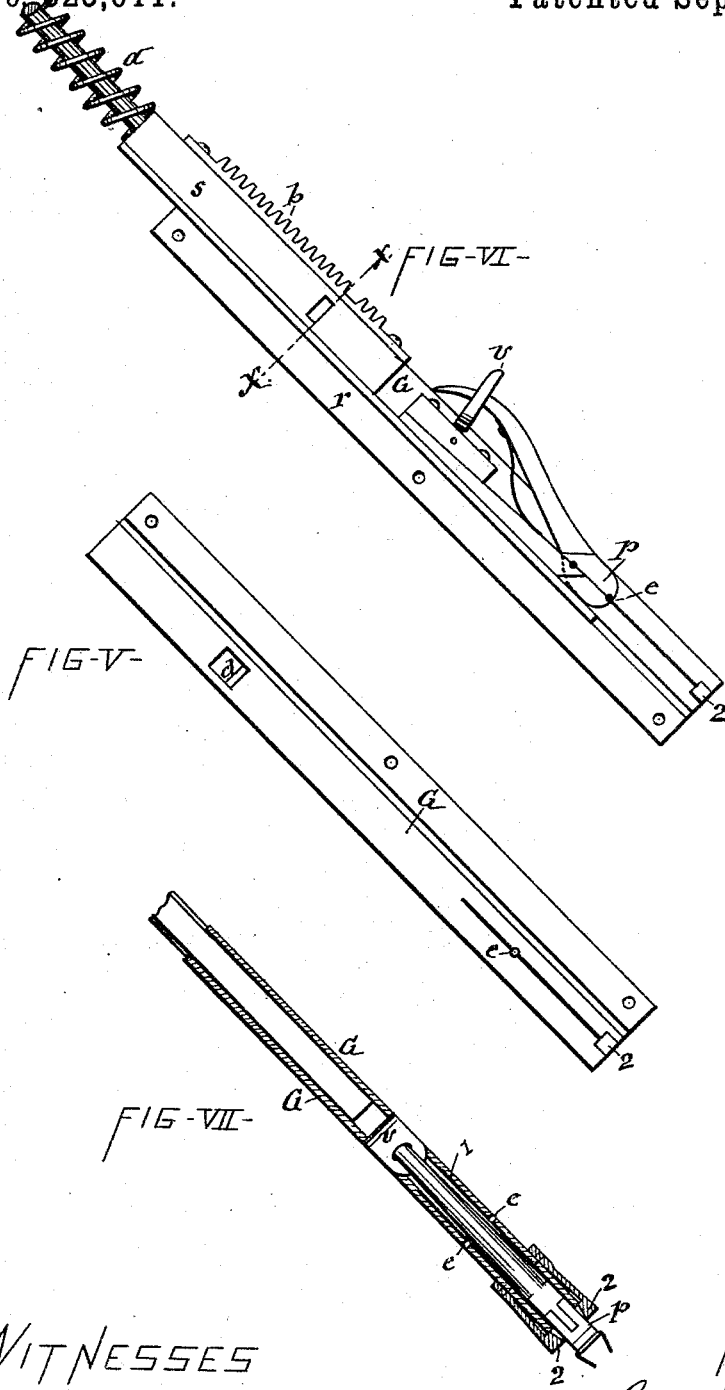

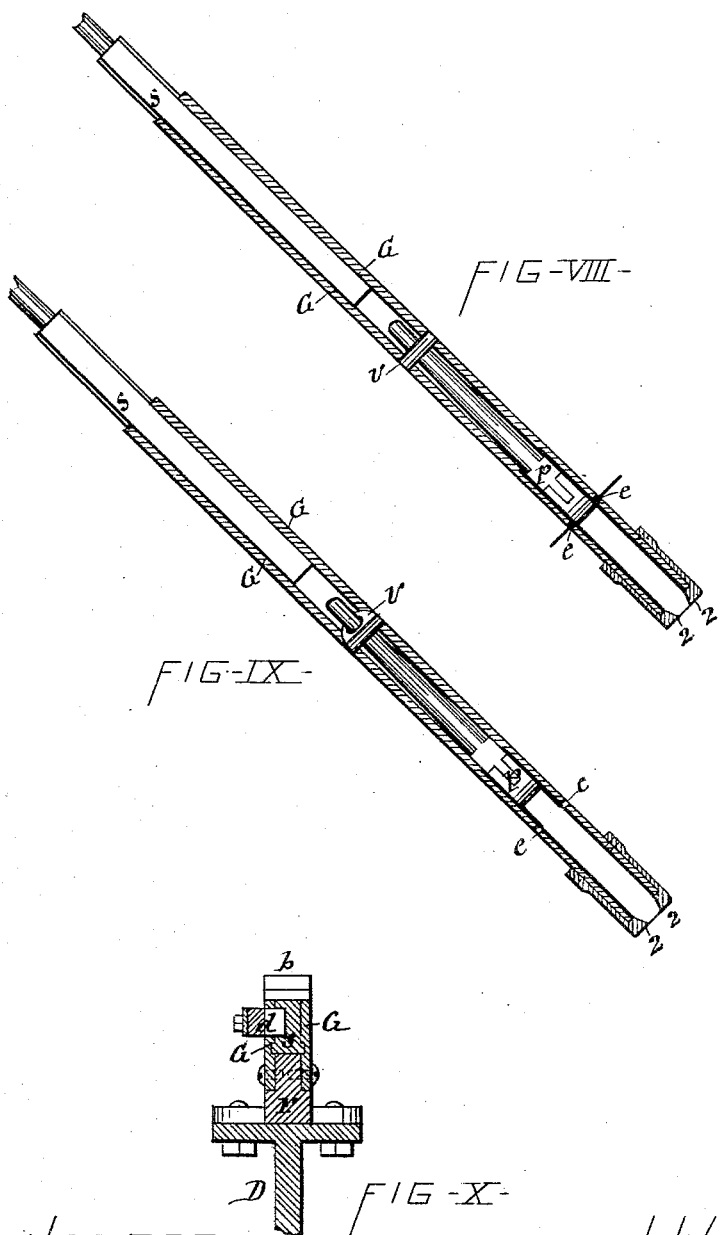

(No Model.) 6 Sheets—Sheet 6.
G. D. KING.
MACHINE FOR FORMING AND DRIVING WIRE STAPLES.
No. 325,611. Patented Sept. 1, 1885.
FIG-12- 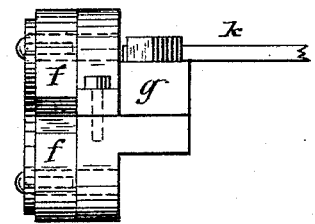
FIG-13- 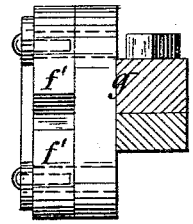
FIG-11- 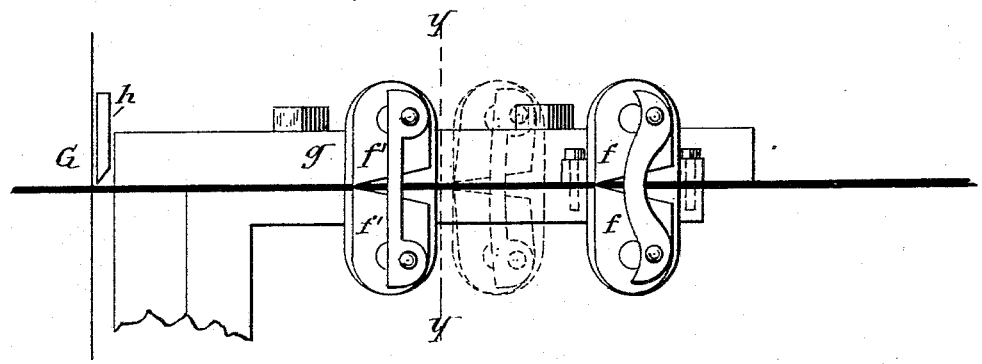
ATTEST—
Wm E. Raymond
E. Bendixen
INVENTOR—
George D King
per Dodge, Lassell Hey
his Attys

United States Patent Office.

GEORGE D. KING, OF OSWEGO, NEW YORK, ASSIGNOR TO THE WOOD BOARD MANUFACTURING COMPANY, OF SAME PLACE.

MACHINE FOR FORMING AND DRIVING WIRE STAPLES.

SPECIFICATION forming part of Letters Patent No. 325,611, dated September 1, 1885.

Application filed December 18, 1884. (No model.)

*To all whom it may concern:*

Be it known that I, GEORGE D. KING, of Oswego, in the county of Oswego, in the State of New York, have invented new and useful Improvements in Machines for Forming and Driving Wire Staples, of which the following, taken in connection with the accompanying drawings, is a full, clear, and exact description.

This invention relates to the class of machines which automatically and expeditiously form staples from a continuous wire fed to the machine and drive said staples as rapidly as they are formed.

The invention consists in an improved construction and combination of the component members of the machine and the mechanism for transmitting the requisite motions to the same, whereby said machine is rendered more efficient and reliable in its operation.

In the annexed drawings, Figures I and II are elevations of my invention, taken from opposite sides thereof, with parts of the frame broken away. Fig. III is a face view of the same. Fig. IV is a view of the end toward which the staples are driven. Fig. V is a detail view of the inner side of one of the guide-plates, showing the groove for the reception of the shank of the staple and the protruding portion of the latch. Fig. VI is a detached side view of the slide and pinchers attached thereto. Fig. VII is a longitudinal section of the forward or lower ends of the guides with the pinchers in position for driving the staple. Fig. VIII is a longitudinal section of the aforesaid guides with the pinchers in position for grasping the blank from which the staple is to be formed. Fig. IX illustrates the operation of forming the staple. Fig. X is a transverse section of the said guides and the slide which carries the pinchers, taken on line $xx$, to show the operation of the latch. Fig. XI is an enlarged detached front view of the devices for feeding the wire to the machine. Fig. XII is an end view of the same, and Fig. XIII is a transverse section on line $yy$, Fig. XI.

Similar letters of reference indicate corresponding parts.

A represents the main frame of the machine, provided with a suitable support, B, for a die, C, on which to place the article to which the staple is to be applied, said article in this case being represented in the form of a paper or wood tray, and its support consisting of a wheel on which is mounted the male die, over which the said tray is formed and retained to have the flaps of the blank fastened by wire staples.

D represents a stout bracket rigidly secured to the frame A, and formed with a way, $r$, inclined toward the die C. On opposite sides of said way are clamped two guide-plates, G G, and between the latter is arranged a slide, $s$, to the lower end of which is attached one of the arms or handles of a pair of pinchers, $p$, which are fitted to slide between the guides G G. Said guides are provided near their lower ends with eyes $e\,e$ directly opposite each other, and of a size to receive through them the wire blank from which the staple is to be formed. The pinchers receive a reciprocating motion by the medium of a spiral spring, $a$, which surrounds a stem projecting rearward from the slide $s$, and propels the slide with the pinchers toward the die C.

On the slide $s$ is a rack, $b$, and over said rack is a mutilated pinion, $c$, mounted on a cross-shaft, $l$, which is journaled on arms D′, firmly secured to the bracket D. Said cross-shaft receives rotary motion by means of a miter-pinion, $t$, on the end of said shaft, meshing in another pinion, $t'$, attached to a shaft, $u$, which is suitably connected with the prime motor to transmit motion to the aforesaid cross-shaft $l$.

The cogs of the mutilated pinion $c$ are arranged in two sets, the first set being adapted to move the slide from its extreme propelled position backward a proper distance to bring in coincidence with the eyes $e\,e$ the open jaws of the pinchers $p$, in which position the pinchers are momentarily detained by a spring-latch, $d$, which is pivoted on one of the guide-plates G, and has a tooth passing through said guide-plate and entering a notch in the side of the slide $s$, as shown in Fig. X of the drawings.

A single isolated cog, constituting the second set of cogs on the mutilated pinion $c$, retracts the slide s and pinchers p a short distance farther, and during this movement the pinchers are caused to close upon the wire blank inserted through the eyes e e, as hereinafter described. Said action of the pinchers is produced by a lever or cam, v, pivoted on the fixed arm of the pinchers, and having in its free end an eye through which the other arm of the pinchers passes, the latter arm being curved in such a manner that in crowding the lever v onto said arm the jaws of the pinchers become closed or compressed. The lever v is automatically crowded onto the hinged arm of the pinchers by a stop or rigid arm, w, attached to the bracket D, which arm the free end of the lever v encounters during the hereinbefore-described second retracting movement of the slide s. The pinchers p, having thus a firm hold on the wire blank, draw the same back with them, and in so doing the ends of the blank are drawn out of the eyes e e and bent at right angle to the portion held between the jaws of the pinchers by the pressure of the guide-plates G G, which are each provided on their inner side with a slight channel, 1, for the reception of the shanks of the staple thus formed of the wire blank. By the time the wire staple is complete, as aforesaid, the isolated cog or second set of cogs of the mutilated pinion c leaves the rack b, and as soon as this is effected the spring a propels the slide and pinchers, and causes the latter to drive the wire staple into the article held on the die C. Nearly or quite simultaneously with the end of the stroke of the pinchers, the lever or cam v strikes a second and preferably somewhat elastic stop or arm, w', which throws the said lever out of engagement with the vibratory arm or handle of the pinchers, and thus allows the jaws thereof to open and free themselves from the staple.

In driving the staple as aforesaid, the shanks thereof are slightly pressed inward by springjaws 2 2, connected to the ends of the guideplates G G, and projecting on the inner sides thereof, as shown in Fig. VII of the drawings, said inward bends of the shanks of the staple facilitating the clinching thereof upon the article into which the staple is driven.

The staples are formed from a continuous wire, which is fed into the machine and pushed through the eyes e e of the guides G G by two grippers, f and f', each of which consists of two pivoted dogs arranged with their free ends meeting each other, and inclined toward the eyes e e of the guides G G, so that the wire may pass freely between said dogs toward the eyes e e, but become gripped between said dogs to prevent the retracting of the wire.

The gripper f, which is farthest from the guides G G, is arranged stationary in its position, and the other gripper, f', is attached to a bar, g, which is adapted to slide toward and from the guides G G. The construction of said grippers and their supports is illustrated in detail in Figs. XI, XII, and XIII of the drawings. Said bar g receives a reciprocating movement by a centrally-pivoted lever, k, which is at one end connected with the bar g, and is provided at the opposite end with a lug, which projects into a cam-groove, m, in a roller, i, mounted on the cross-shaft l, hereinbefore described.

Between the gripper f' and the guides G G is arranged a cutter or knife, h, which moves across the path of the wire to sever the same and cut therefrom the blank of the requisite length to form the staple. Said cutter is operated by a centrally-pivoted lever, o, to one end of which the cutter is attached, the opposite end of said lever resting on the periphery of the roller i, which has projecting from it a cam, n. This cam n, the cam-groove m, and mutilated pinion c are so arranged in relation to each other as to compel the gripper f to first pass the wire toward the guides G G (the end of the wire having been previously inserted in the eyes e e of the guides) and momentarily hold the wire while the cutter h is made to sever said wire, after which the aforesaid gripper recedes to obtain another hold on the wire, the stationary gripper in the meantime holding the end of the wire to prevent its being retracted.

During the operation of feeding the wire toward the eyes e e of the guides G G, the mutilated pinion c leaves the pinchers p at rest, and the latch d retains them in position to allow the wire to pass between the jaws of the pinchers, said jaws being provided with a transverse groove for the reception of said wire, as before described. Immediately after the cutter h has severed the wire, the isolated cog, or second set of cogs of the pinion c, draws back the pinchers a sufficient distance to draw the ends of the wire blank in between the guides, and thus bend said ends at right angles to the portion held in the jaws of the pinchers and impart to the blank the staple form. In this last movement of the pinchers they are caused to grip more firmly the staple by the collision of the cam or lever v with the arm w, and by the time this is effected the mutilated pinion releases the rack b, and allows the spring a to propel the slide s and pinchers connected therewith, and thereby drive the staple into the article held on the die C. At the end of this stroke the pinchers are caused to open their jaws and release the staple by the collision of the cam or lever v with the arm w', as hereinbefore described, and the first set of cogs of the mutilated pinion engages the rack b to retract the slide with its pinchers.

Having described my invention, what I claim as new is—

1. The reciprocating pinchers, in combination with the guides provided with eyes for the reception of the wire blank, as set forth and shown.

2. The combination of the guides provided with the eyes for the reception of wire blanks, reciprocating pinchers sliding between said guides, and a cam or lever arranged to intermittently compress the pinchers during the reciprocating movement thereof, substantially as described.

3. In combination with the guides provided with eyes for the reception of the wire blank and reciprocating pinchers sliding between said guides, a cam or lever arranged to intermittently compress the pinchers, and spring-jaws in the ends of the guides arranged to press inward the shanks of the staple forced between them by the pinchers in driving said staple, substantially as set forth and shown.

4. In combination with the guides provided with eyes for the reception of the wire blank, the reciprocating pinchers sliding between said guides, a lever pivoted on one of the handles of the pinchers and engaging the other of said handles, and stops for tripping the aforesaid lever during the reciprocating movement of the pinchers, and thereby automatically open and close the latter, substantially as and for the purposes set forth.

5. In combination with the guides provided with eyes for the reception of the wire blank, a slide between the guides, pinchers attached to the slide, a spring for propelling the slide, and mechanism, substantially as described, for retracting said slide, as set forth.

6. In combination with the guides provided with eyes for the reception of the wire blank, a slide between the guides, pinchers attached to the slide, a propelling-spring connected with the slide, a rack on the slide, and a mutilated pinion engaging said rack to intermittently retract the slide, substantially as set forth and shown.

7. In combination with the guides G G, slide $s$, and the pinchers $p$, attached to said slide, the propelling-spring $a$, rack $b$ on the slide, the mutilated pinion $c$, and the latch $d$, for arresting the movement of the slide, substantially as described and shown.

8. In combination with the guides G G, provided with eyes $e\ e$, and the pinchers $p$, sliding between said guides, intermittent feed mechanism for passing the wire to the eyes of the guides, and a cutter situated between the feed mechanism and guides, substantially as and for the purpose specified.

In testimony whereof I have hereunto signed my name and affixed my seal, in the presence of two attesting witnesses, at Oswego, in the county of Oswego, in the State of New York, this 12th day of December, 1884.

GEORGE D. KING. [L. S.]

Witnesses:
   JOHN D. KEEFE,
   JOHN MAHAFFY.